(12) United States Patent
Lubbers et al.

(10) Patent No.: US 7,743,216 B2
(45) Date of Patent: Jun. 22, 2010

(54) PREDICTING ACCESSES TO NON-REQUESTED DATA

(75) Inventors: Clark E. Lubbers, Colorado Springs, CO (US); Michael D. Walker, Colorado Springs, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 2 days.

(21) Appl. No.: 11/479,732

(22) Filed: Jun. 30, 2006

(65) Prior Publication Data

US 2008/0005480 A1    Jan. 3, 2008

(51) Int. Cl.
*G06F 12/00* (2006.01)
(52) U.S. Cl. ............... 711/137; 711/118; 711/E12.057
(58) Field of Classification Search .................. None
See application file for complete search history.

(56) References Cited

U.S. PATENT DOCUMENTS

| | | | |
|---|---|---|---|
| 5,388,247 A * | 2/1995 | Goodwin et al. ............ 711/143 |
| 5,623,608 A | 4/1997 | Ng | |
| 5,761,718 A | 6/1998 | Lin et al. | |
| 5,812,996 A | 9/1998 | Rubin et al. | |
| 6,098,604 A | 8/2000 | Nemoto et al. | |
| 6,633,891 B1 | 10/2003 | Banford et al. | |
| 6,671,766 B1 | 12/2003 | Vandenberg et al. | |
| 6,738,865 B1 | 5/2004 | Burton et al. | |
| 6,813,693 B2 | 11/2004 | Chilimbi | |
| 6,868,439 B2 | 3/2005 | Basu et al. | |
| 6,910,106 B2 | 6/2005 | Sechrest et al. | |
| 6,934,802 B2 | 8/2005 | Cornaby et al. | |
| 6,978,325 B2 | 12/2005 | Gibble et al. | |
| 7,058,936 B2 | 6/2006 | Chilimbi et al. | |
| 2001/0018678 A1 | 8/2001 | Weiss et al. | |
| 2002/0078303 A1 | 6/2002 | Rozario et al. | |
| 2003/0200393 A1 | 10/2003 | Cornaby et al. | |
| 2004/0024971 A1 | 2/2004 | Bogin et al. | |
| 2004/0205297 A1 | 10/2004 | Bearden | |
| 2005/0060498 A1 | 3/2005 | Curtis | |
| 2005/0154725 A1 * | 7/2005 | Day et al. ....................... 707/5 |

\* cited by examiner

*Primary Examiner*—Reginald G Bragdon
*Assistant Examiner*—Baboucarr Faal
(74) *Attorney, Agent, or Firm*—Fellers, Snider, et al.

(57) ABSTRACT

Method and apparatus for caching and retaining non-requested speculative data from a storage array in an effort to accommodate future requests for such data. A cache manager stores requested readback data from the storage array to a cache memory, and selectively transfers speculative non-requested readback data to the cache memory in relation to a time parameter and a locality parameter associated with a data structure of which the requested readback data forms a part. The locality parameter preferably comprises a stream count as an incremented count of consecutive read requests for a contiguous data range of the storage array, and the time parameter preferably indicates a time range over which said read requests have been issued. The speculative readback data are transferred when both said parameters fall within a selected threshold range. The data structure preferably comprises a RAID stripe on a selected storage device of the array.

24 Claims, 5 Drawing Sheets ent invention are generally directed to an apparatus and method for caching and retaining non-requested speculative data from a storage array in an effort to accommodate future requests for such data.

PREDICTING ACCESSES TO NON-REQUESTED DATA

FIELD OF THE INVENTION

The claimed invention relates generally to the field of data storage systems and more particularly, but not by way of limitation, to a method and apparatus for caching and retaining non-requested speculative data in an effort to accommodate future requests for such data.

BACKGROUND

Storage devices are used to access data in a fast and efficient manner. Some types of storage devices use rotatable storage media, along with one or more data transducers that write data to and subsequently read data from tracks defined on the media surfaces.

Multi-device arrays (MDAs) can employ multiple storage devices to form a consolidated memory space. One commonly employed format for an MDA utilizes a RAID (redundant array of independent discs) configuration, wherein input data are stored across multiple storage devices in the array. Depending on the RAID level, various techniques including mirroring, striping and parity code generation can be employed to enhance the integrity of the stored data.

With continued demands for ever increased levels of storage capacity and performance, there remains an ongoing need for improvements in the manner in which storage devices in such arrays are operationally managed. It is to these and other improvements that preferred embodiments of the present invention are generally directed.

SUMMARY OF THE INVENTION

Preferred embodiments of the present invention are generally directed to an apparatus and method for caching and retaining non-requested speculative data from a storage array in an effort to accommodate future requests for such data.

In accordance with preferred embodiments, a cache manager stores requested readback data from the storage array to a cache memory, and transfers speculative non-requested readback data to the cache memory in relation to a time parameter and a locality parameter associated with a data structure of which the requested readback data forms a part.

The locality parameter preferably comprises a stream count as an incremented count of consecutive read requests for a contiguous data range of the storage array, and the time parameter preferably indicates a time range over which said read requests have been issued. The speculative readback data are transferred when both said parameters fall within a selected threshold range. The data structure preferably comprises a RAID stripe on a selected storage device of the array.

These and various other features and advantages which characterize the claimed invention will become apparent upon reading the following detailed description and upon reviewing the associated drawings.

DETAILED DESCRIPTION

Figure 1:
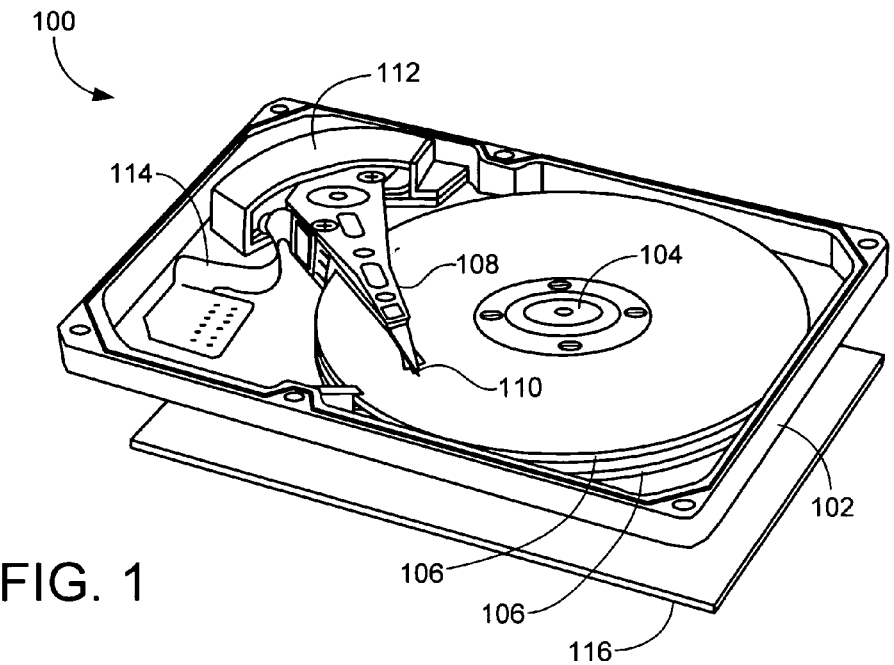
FIG. 1 generally illustrates a storage device constructed and operated in accordance with preferred embodiments of the present invention.

FIG. 1 shows an exemplary storage device 100 configured to store and retrieve user data. The device 100 is preferably characterized as a hard disc drive, although other device configurations can be readily employed as desired.

A base deck 102 mates with a top cover (not shown) to form an enclosed housing. A spindle motor 104 is mounted within the housing to controllably rotate media 106, preferably characterized as magnetic recording discs.

A controllably moveable actuator 108 moves an array of read/write transducers 110 adjacent tracks defined on the media surfaces through application of current to a voice coil motor (VCM) 112. A flex circuit assembly 114 provides electrical communication paths between the actuator 108 and device control electronics on an externally mounted printed circuit board (PCB) 116.

Figure 2:
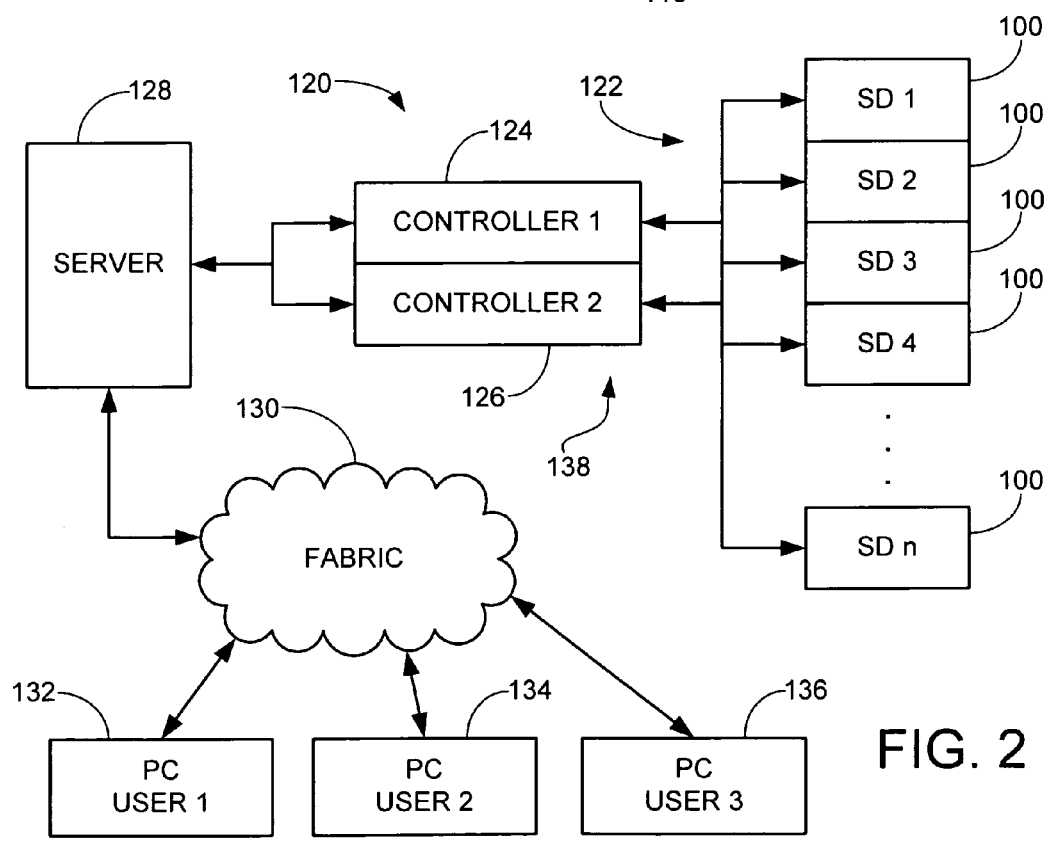
FIG. 2 is a functional block diagram of a network system which utilizes a number of storage devices such as illustrated in FIG. 1.

FIG. 2 generally illustrates an exemplary network system 120 that advantageously incorporates a number n of the storage devices (SD) 100 to form a consolidated storage array 122. Redundant controllers 124, 126 preferably operate to transfer data between the storage array 122 and a server 128. The server 128 in turn is connected to a fabric 130, such as a local area network (LAN), the Internet, etc.

Remote users respectively access the fabric 130 via personal computers (PCs) 132, 134, 136. In this way, a selected user can access the storage space 122 to write or retrieve data as desired.

The devices 100 and the controllers 124, 126 are preferably incorporated into a multi-device array (MDA) 138. The MDA 138 preferably uses one or more selected RAID (redundant array of independent discs) configurations to store data across the devices 100. Although only one MDA and three remote users are illustrated in FIG. 2, it will be appreciated that this is merely for purposes of illustration and is not limiting; as desired, the network system 120 can utilize any number and types of MDAs, servers, client and host devices, fabric configurations and protocols, etc.

Figure 3:
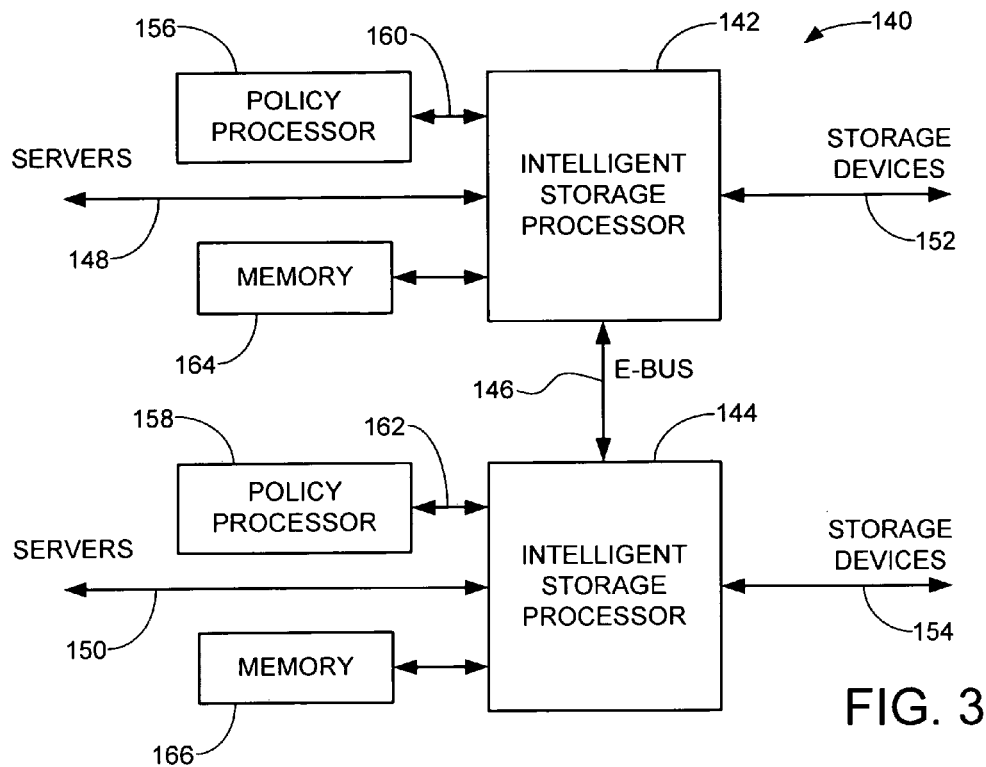
FIG. 3 provides a general representation of a preferred architecture of the controllers of FIG. 2.

FIG. 3 shows an array controller configuration 140 such as useful in the network of FIG. 2. Two intelligent storage processors (ISPs) 142, 144 are coupled by an intermediate bus 146 (referred to as an "E BUS"). Each of the ISPs 142, 144 is preferably disposed in a separate integrated circuit package on a common controller board. Preferably, the ISPs 142, 144 each respectively communicate with upstream application servers via fibre channel server links 148, 150, and with the storage devices 100 via fibre channel storage links 152, 154.

Policy processors 156, 158 execute a real-time operating system (RTOS) for the controller 140 and communicate with the respective ISPs 142, 144 via PCI busses 160, 162. The policy processors 156, 158 can further execute customized logic to perform sophisticated processing tasks in conjunction with the ISPs 142, 144 for a given storage application. The ISPs 142, 144 and the policy processors 156, 158 access memory modules 164, 166 as required during operation.

Figure 4:
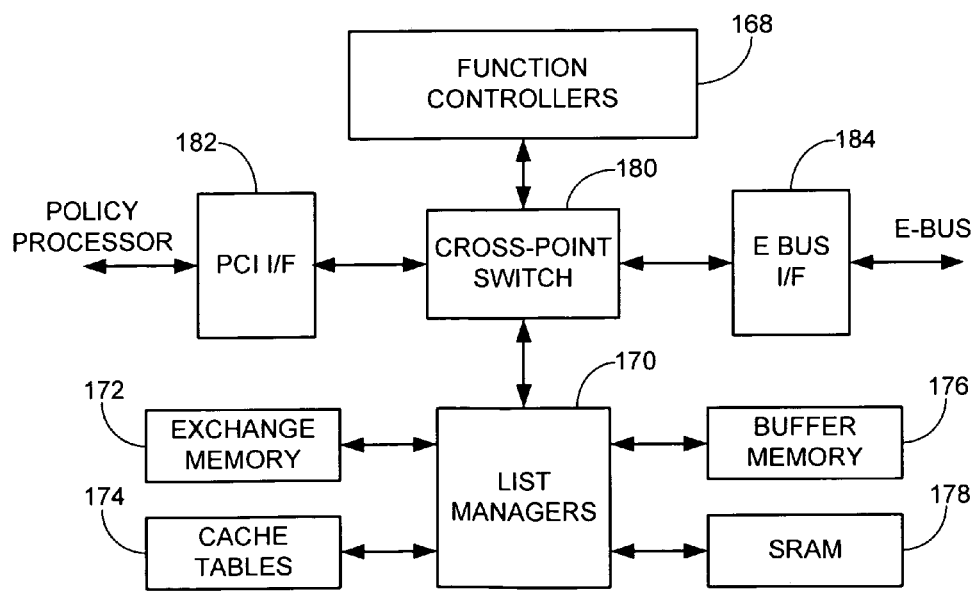
FIG. 4 provides a functional block diagram of a selected intelligent storage processor of FIG. 3.

FIG. 4 provides a preferred construction for a selected ISP of FIG. 3. A number of function controllers, collectively identified at 168, serve as function controller cores (FCCs) for a number of controller operations such as host exchange, direct memory access (DMA), exclusive-or (XOR), command routing, metadata control, and disc exchange. Each FCC preferably contains a highly flexible feature set and interface to facilitate memory exchanges and other scheduling tasks.

A number of list managers, denoted generally at 170 are used for various data and memory management tasks during controller operation, such as cache table management, metadata maintenance, and buffer management. The list managers 170 preferably perform well-defined albeit simple operations on memory to accomplish tasks as directed by the FCCs 168. Each list manager preferably operates as a message processor for memory access by the FCCs, and preferably executes operations defined by received messages in accordance with a defined protocol.

The list managers 170 respectively communicate with and control a number of memory modules including an exchange memory block 172, a cache tables block 174, buffer memory block 176 and SRAM 178. The function controllers 168 and the list managers 170 respectively communicate via a crosspoint switch (CPS) module 180. In this way, a selected function core of controllers 168 can establish a communication pathway through the CPS 180 to a corresponding list manager 170 to communicate a status, access a memory module, or invoke a desired ISP operation.

Similarly, a selected list manager 170 can communicate responses back to the function controllers 168 via the CPS 180. Although not shown, separate data bus connections are preferably established between respective elements of FIG. 4 to accommodate data transfers therebetween. As will be appreciated, other configurations can readily be utilized as desired.

A PCI interface (I/F) module 182 establishes and directs transactions between the policy processor 156 and the ISP 142. An E-BUS I/F module 184 facilitates communications over the E-BUS 146 between FCCs and list managers of the respective ISPs 142, 144. The policy processors 156, 158 can also initiate and receive communications with other parts of the system via the E-BUS 146 as desired.

The controller architecture of FIGS. 3 and 4 advantageously provides scalable, highly functional data management and control for the array. Preferably, stripe buffer lists (SBLs) and other metadata structures are aligned to stripe boundaries on the storage media and reference data buffers in cache that are dedicated to storing the data associated with a disk stripe during a storage transaction.

When data requests are issued by a host device (such as PCs 132, 134, 136 in FIG. 2), the controller 122 directs the movement of the requested readback data from the storage devices 100 to cache memory in preparation for subsequent transfer to the host device. To further enhance processing efficiency, the controller architecture preferably employs a novel speculative data caching methodology.

Speculative data are non-requested data that are moved to the cache memory in hopes of satisfying a subsequent request for that data by a host device. Generally, preferred embodiments of the present invention are directed to adaptively making decisions with regard to when to perform a speculative read, as well as to managing the retention of such speculative data in cache.

Figure 5:
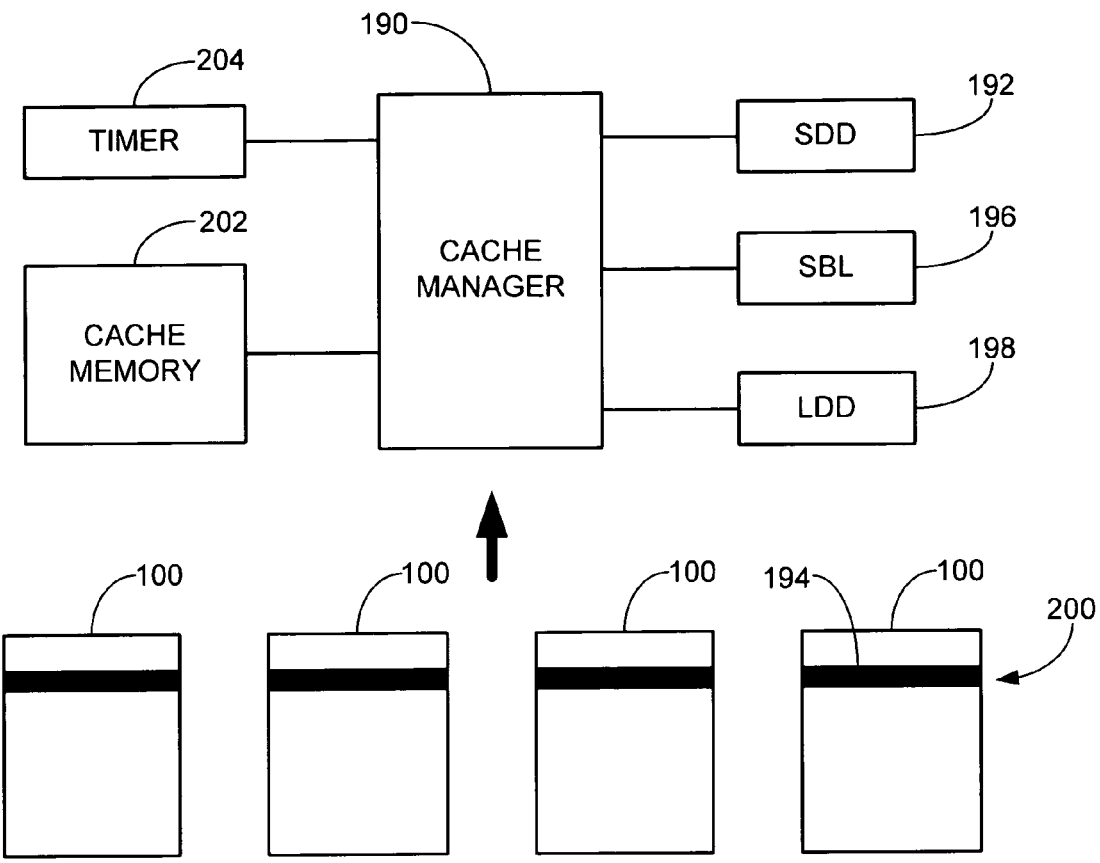
FIG. 5 generally illustrates a cache manager which operates to manage readback data retrieved from the storage array in accordance with preferred embodiments.

As shown in FIG. 5, cached data are preferably managed on a node basis by a cache manager (CM) 190 using a data structure referred to as a stripe data descriptor (SDD) 192. Each SDD holds data concerning recent and current accesses to the data with which it is associated. Each SDD thus preferably corresponds to and aligns with a data structure as a subset of the overall storage array, such as a corresponding RAID stripe 194 (i.e., all of the data on a selected device 100 associated with a particular parity set). Each SDD 192 further preferably conforms to a particular SBL 196.

Each cache node managed by the CM 190 preferably references some particular SDD, with active SDD structures for a given set of logical discs (subset of the devices 100) being preferably linked in ascending order via a virtual block address (VBA) using a standard forward and backward linked list. The logical discs are preferably managed using an associated logical disc descriptor (LDD) 198.

Preferably, the VBA values are aligned with the RAID data organization using a grid system sometimes referred to as a RAID Allocation Grid System (RAGS). Generally, any particular collection of blocks belonging to the same RAID strip 200 (e.g., all of the data contributing to a particular parity set) will be assigned to a particular reliable storage unit (RSU) on a particular sheet.

A book consists of a number of sheets and is constructed from multiple contiguous sets of blocks from different devices 100. Based on the actual sheet and VBA, the books can be further sub-divided into zones, indicating the particular device or device set (when redundancy is employed).

Each SDD 192 preferably includes variables (parameters) that indicate various states of the data. SDD variables that are preferably utilized in accordance with preferred embodiments include access history, last offset, last block, timestamp data (time of day, TOD), RAID level employed, stream count, stream size, and speculative data status.

The access history of the SDD 192 preferably provide a relative measure of a rate at which accesses are made to the data associated with the SDD. For example, an accesses variable can be an incremental count that is updated upon each access to the data defined by the SDD. The accesses variable thus provides an indication of "host interest" in the data in this locality; under normal circumstances, a higher existing number of accesses might produce a higher likelihood that more accesses will occur in the near future.

The TOD variable generally provides an indication of elapsed time since the most recent access. By subtracting the TOD variable from the current time, an aging assessment can be made on how frequently (or infrequently) the SDD is being accessed.

The stream count generally provides an incremental count of successively issued requests for data from the storage array that falls into a concurrent sequence (a "stream"). Stream size provides an overall indication of the then existing size of the stream (such as in terms of overall numbers of sectors, etc.). When a request just follows a previous request as determined by the VBA matching the previous last VBA based on the last offset and last block values, the stream count is incremented and the stream size is adjusted to match the new overall range. The speculative data status value generally identifies the associated data ranges of speculatively retrieved data within the stream.

The LDD 198 preferably provides data on a logical disc basis, which can span several SDDs. The LDD 198 includes a number of variables utilized in the various preferred embodiments discussed herein including an LDD stream count and LDD stream size.

Preferably, during normal operations the cache manager 190 operates to direct the retrieval of requested data from the storage array to cache memory, such as represented by block 202 in FIG. 5. The cache manager 190 will also operate from time to time to additionally retrieve speculative non-requested data along with the retrieval of the requested data. A timer 204 preferably characterized as a free running counter provides timing information to assess aging of the cached requested and speculative data.

Figure 6:
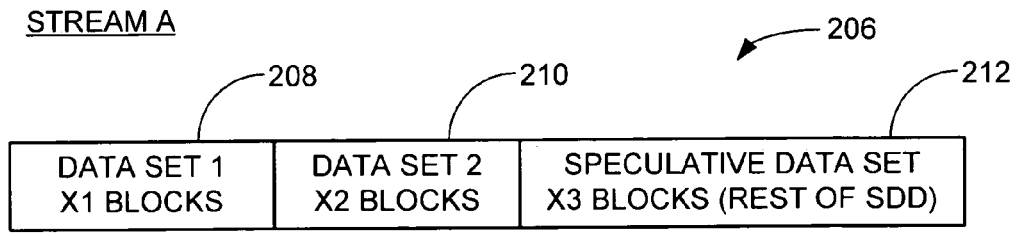
FIG. 6 shows an exemplary stream of data retrieved by the cache manager from the storage array to the cache memory.

In a preferred embodiment, an operation to retrieve speculative data commences upon detection of a stream; that is, detection of a number of successive requests for consecutively placed read data. An exemplary stream 206 ("STREAM A") is represented in FIG. 6. The stream 206 is stored in the cache memory 202 and constitutes a number of consecutive, concurrently addressed blocks (sectors).

In the present example, the CM 190 receives and satisfies a first request to retrieve a first set of data 208 (DATA SET 1), with a corresponding number of blocks X1. At some point during this processing the CM receives and satisfies a second request to retrieve a second set of data 210 (DATA SET 2), with blocks X2. Note that X2 may or may not be the same number of blocks as X1, but the blocks X1 and X2 preferably define an overall sequential range of block addresses of a selected SDD data structure.

Upon receipt of the second read request, the CM 190 elects to proceed with the retrieval of speculative, non-requested data as represented by block 212. The block 212 represents speculative data, in this case X3 blocks corresponding to the rest of the SDD data structure (e.g., the rest of the associated stripe 194 in FIG. 5 from the associated device 100).

The decision by the CM 190 to proceed with pulling speculative data is preferably carried out through reference to both time and locality parameters: that is, the SDD stream count indicates a count of 2, the SDD stream size indicates a large enough sequence of data has been requested to indicate a stream, and the TOD value indicates that the requests are currently ongoing (i.e., "now").

Under such circumstances, the CM 190 preferably determines that there is a likelihood of future requests for the rest of the SDD data structure, and it is sufficiently efficient from a transfer latency standpoint to proceed with pulling the rest of the SDD data (an extra seek is highly unlikely).

It will be noted at this point that while preferred, it is not necessarily required that the CM 190 operate to retrieve the rest of the entire data structure. In alternative embodiments, intermediate groups of data less than the entire data structure can be speculatively read upon detection of a stream.

Figure 7:
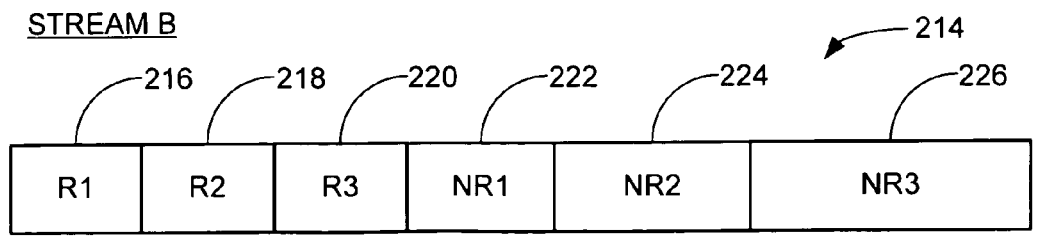
FIG. 7 shows an alternative exemplary stream of data retrieved by the cache manager from the storage array to the cache memory.

An alternative exemplary stream 214 ("STREAM B") is shown in FIG. 7. The stream 214 includes first, second and third sets of requested readback data 216, 218 and 220 (R1, R2, R3). Upon detection of these requested readback data sets, speculative non-requested data sets 222, 224, 226 (NR1, NR2, NR3) are pulled, which may or may not extend to the full SDD data structure. Preferably, as the stream size grows, larger amounts of speculative data are increasingly requested.

Figure 8:
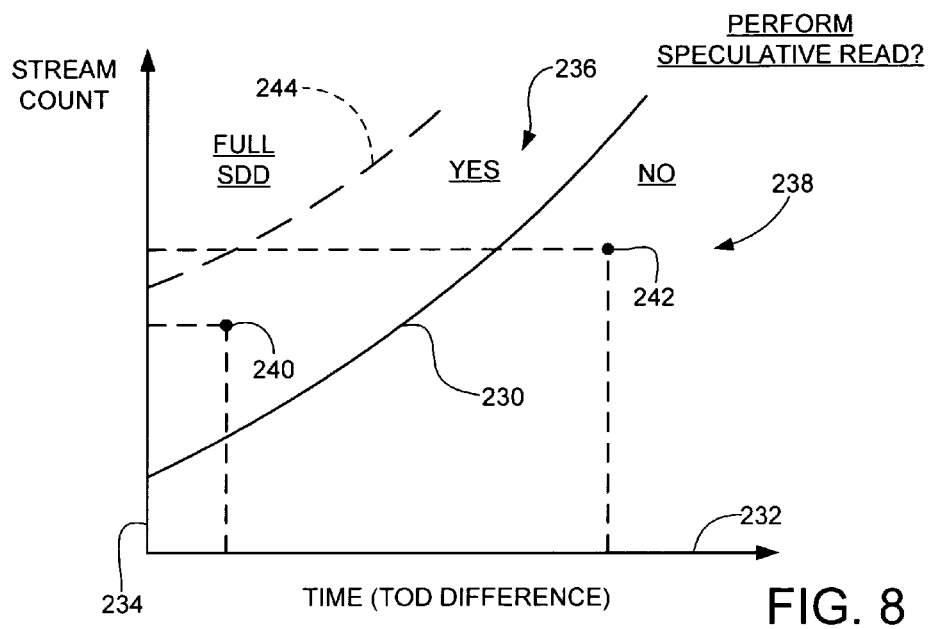
FIG. 8 graphically illustrates a boundary curve to set forth a preferred operation of the cache manager in making decisions with regard to caching speculative non-requested data.

FIG. 8 provides a graphical representation of a boundary curve 230 plotted against a TOD difference x-axis 232 and a stream count y-axis 234. As will be appreciated, "TOD difference" refers to the time delta between "now" (the currently reflected TOD) and the time of the last reference to the SDD (the TOD at that time).

The curve 230 generally forms separate decision regions 236, 238 respectively above and below the curve 230. The curve 230 is generally indicative of the operation of the CM 190, and can thus take any suitable shape and can further be adaptively adjusted in response to observed performance.

Generally, the decision as to whether speculative data should be pulled is preferably made in relation to where a given operational point falls in the graph. Operational point 240 corresponds to a given stream count and TOD indication that collectively indicate that it would be advantageous to proceed with a speculative data pull, as point 240 falls within "yes" region 236. By contrast, operational point 242 provides stream count and TOD values that indicate that it would be better not to proceed with a speculative data pull at this time, since point 242 falls within "no" region 238.

It can be seen that a speculative data pull can be triggered in response to a relatively small stream count, so long as the read commands are issued over a correspondingly short period of time. At the same time, a larger stream count will generally be required to trigger a speculative data pull if the commands are more widely spaced apart. The boundary curve 230 thus operates as respective thresholds for the time and locality parameters, both of which need be met prior to a speculative data pull.

As desired, additional boundary curves can be provided to the yes region 236 to provide gradients in the amount of speculative data that should be pulled. For example, operational points above curve 244 can trigger the speculative read of an entire SDD data structure.

Figure 9:
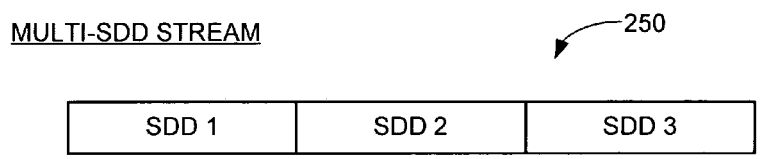
FIG. 9 shows a sequence of different streams concurrently maintained by the cache manager.

Preferably, each SDD 192 provides stream count, size and TOD values relating to the associated SDD data structure. Under some scenarios the stream may extend across multiple adjacent SDDs within the logical disk, such as shown by stream 250 in FIG. 9. It will be appreciated that the stream 250 can comprise groups of both requested and speculative non-requested data that consecutively span the overall range of the stream.

Once speculative data have been moved into the cache memory 202, the CM 190 preferably employs additional processes to manage the retention of such data. As will be appreciated, cache memory is a valuable and limited resource. Once a selected set of memory cells in the cache memory 202 have been allocated to store a particular set of data, those memory cells are unavailable to store other data until the memory cells are deallocated. An efficient cache management methodology thus attempts to store and retain only data that has value in terms of satisfying future cache hits, and to discard the rest.

Accordingly, the CM 190 preferably operates to time out all cached data, whether requested or non-requested, if such data have not been requested by a host within a selected period of time. The timer 204 and the TOD variables of the SDD 192 can be utilized to track this. Moreover, it is preferred, although not required, that at least speculatively retrieved data is released from cache memory (deallocated) once a read request is issued for the data.

Such release can take place in relation to the access history of the SDD 192; for example, if the access variable indicates a relatively high level of accesses to the cached data structure, repetitive requests for the same data are more likely, thus lessening the desirability of releasing cached data (speculative or requested) from the cache 202.

When data are discarded from cache memory, the LDD stream size and stream count values are updated based on where in the associated stream the discarded data were disposed. Thus, a single large stream made up of both requested and speculative data, such as the stream 250 in FIG. 9, may be broken into two or more sub-streams if a set of speculative data are removed from cache. It is contemplated, however, that this is less likely than the occurrence of multiple independent and concurrent streams of host data requests, all of which can be readily accommodated by the SDD variables.

Figure 10:
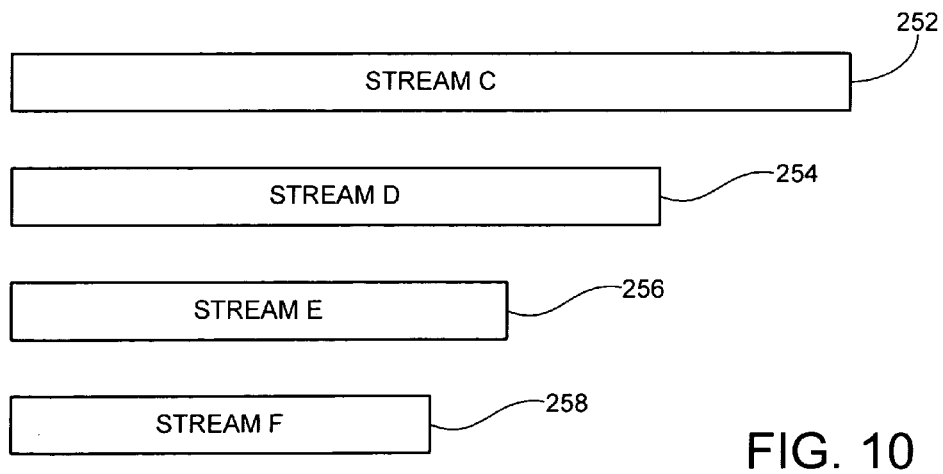
FIG. 10 shows a data stream comprising a plurality of adjacent data structures combined into a single, larger structure.

Over time the cache manager 190 may thus accumulate and track a number of different streams, such as shown by streams 252, 254, 256 and 258 in FIG. 10 (STREAMS C, D, E, F). As mentioned above, these may be separate and independent streams, or may result from one or more parent streams that were broken up into smaller streams. The streams can be sorted and managed by size as shown.

The CM 190 preferably carries out speculative data pulls at this level as well. For example, the CM 190 may detect a renewed interest in the data associated with a selected one of these streams, such as stream 254 (Stream B). In such case, the CM 190 preferably initiates a command to speculatively read additional data, which may include one or more SDDs that consecutively follow the range of the stream 254.

Data retention is also preferably adaptive in view of operational requirements. In some preferred embodiments, when the last data block of a selected SDD 192 receives a cache hit, and that data block was speculatively read into the cache memory, the CM 190 may elect to retain the entire selected SDD 192 in cache memory and speculative retrieve the next sequential SDD 192. On the other hand, if the next sequential SDD 192 already exists in the cache memory, the CM 190 may conversely decide to go ahead and release the selected SDD 192 (or a portion thereof).

Further, when data associated with a selected SDD 192 is first placed into the cache memory 202 and a first access thereto (cache hit) is made to the lowest address block in the structure, the CM 190 preferably inspects the previous SDD (i.e., the SDD that immediately precedes the selected SDD from an addressing standpoint). If the previous SDD is also cached and indicates a non-zero stream size, a larger stream is preferably detected and the stream size and stream count values are carried over. Based on these values, additional speculative data may be read and added to the stream.

In further preferred embodiments, if during a speculative read a cache hit is made upon speculative data just placed into cache, the CM 190 preferably locates the end of the stream and increases the length of the speculative read as appropriate. An ongoing speculative read is preferably terminated in relation to the stream count and stream size pairs to avoid "over shoot" (reading too much speculative data) in the LDD 198 based on the historical stream length data these pairs represent. These pairs are derived initially by determining where speculatively read data in a stream is purged because it is "stale."

Even if a particular stream is terminated, however, if the stream is detected as continuing, the read ahead operation can be resumed and terminated according to the next highest size of the stream.

The foregoing embodiments advantageously accommodate a wide variety of operational loading requirements. However, under certain circumstances the aforedescribed system may miss opportunities to cache speculative data if sequential read requests are made with boundaries that align with existing SDD boundaries. For example, assume that a read request is issued by a host for a full SDD worth of data (e.g., 128 KB) aligned to a 128 KB SDD boundary. Normally, no speculative data pull would be triggered since the entire SDD data structure has been requested, and the data would be released from cache upon transfer to the host.

However, the CM 190 is preferably further configured operate as before at an SDD level; that is, to detect a large scale data transfer of successive SDD requests and, if so, to speculatively pull additional SDDs to sustain the data transfer. Preferably, upon receipt of a read request for a full SDD data structure the CM 190 detects whether the "next" SDD in the sequence already exists in cache memory 202. If not, a backward check is made to the "previous" SDD. If the previous SDD is cached and has a non-zero stream size, then the latest request is handled as an additional request in an ongoing stream. Stream size and stream counts are thus carried forward as before to continue the ongoing stream.

On the other hand, if the previous SDD has a zero stream size and last block and offset values of 0, this may indicate that the previous SDD was pulled as a single block (i.e., a 128 KB request). The currently retrieved SDD is thus a second sequential SDD request, and the CM 190 preferably sets the stream size to 512 and stream count to 2.

Upon the third adjacent request for the next SDD, the CM 190 initiates speculative pulls of additional SDDs worth of data to the cache memory unless the LDD 198 indicates that 512 block transfers are occurring. If sufficient multiple large scale streams are occurring (e.g., on the order of 1 MB or more), speculative reads may further be initiated for an entire stream of the smallest size as indicated by the LDD.

The management and retention of the cached data, whether requested or non-requested, is further preferably carried out in an adaptive manner. For example, existing parameters used to set the thresholds necessary to trigger a speculative data pull, and/or to trigger a deallocation of already cached data, can be adjusted in view of hit ratios or other performance measures.

Figure 11:
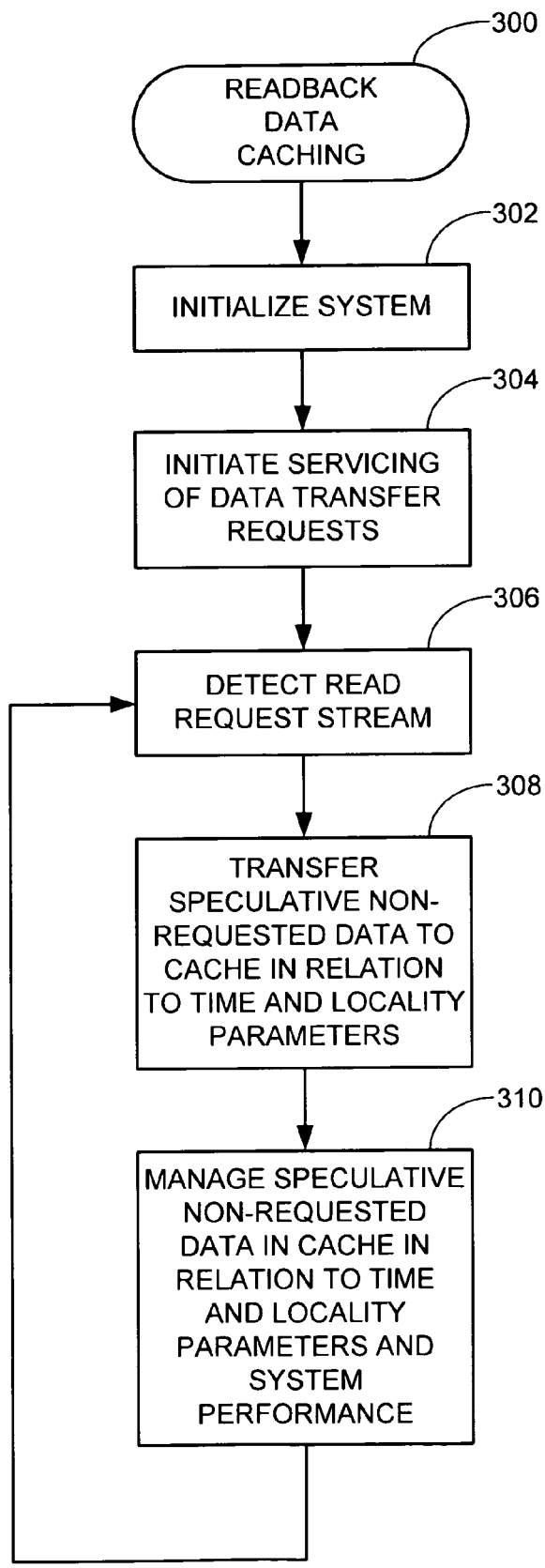
FIG. 11 is a flow chart for a SPECULATIVE DATA CACHING routine generally illustrative of steps carried out in accordance with preferred embodiments of the present invention.

The foregoing operation can be generally illustrated by a SPECULATIVE DATA CACHING routine in FIG. 11, which is generally illustrative of steps carried out in accordance with preferred embodiments of the present invention.

At step 302, a system such as the network 120 of FIG. 2 is initialized for operation. The system proceeds to service data transfer requests at step 304 to transfer data between a storage array such as 122 and various host devices such as 132, 134, 136.

Such requests will preferably include write data requests wherein data to be written to the array are moved to cache memory such as 202 pending subsequent transfer to the devices 100, as well as read data requests wherein data stored on the devices 100 are moved to the cache memory 202 and then on to the requesting device. Preferably, requests for data are satisfied directly from the cache memory in the form of cache hits, as available.

A cache manager such as 190 preferably operates to detect a stream of data requests at step 306. As discussed above, such streams are preferably detected at a variety of levels, including within a selected data structure (e.g., SDD) or among adjacent consecutive data structures, in relation to time and locality parameters of an associated data structure.

Upon detection of a stream, the CM 190 preferably operates at step 308 to initiate retrieval of speculative non-requested data into the cache memory 202. The cached data are further managed and retained at step 310 by the CM 190 preferably in relation to performance of the system, such as a rate at which cache hits are achieved based on existing parameters. Step 310 preferably includes the concurrent management of multiple independent streams.

The foregoing embodiments provide several advantages over the art. Using both time and locality factors in making speculative cache decisions generally provides a better assessment of overall trends in performance loading, and more efficiently allocates cache resources to the retention of data. The adaptive techniques set forth above further provide a mechanism to continuously fine tune various caching parameters to meet changing needs of the system, particularly in high activity regions.

The term caching and the like will be construed consistent with the foregoing discussion as the operation to retain data in cache memory that would otherwise be immediately overwritten by new incoming data. The cache memory can be a single device or incorporated as a memory space across multiple devices.

Although not necessarily required, the caching operation preferably comprises making the decision to allocate memory cells in the cache memory currently storing the readback data so as to prevent overwriting of said cells by other data. A subsequent release of such retained data from the cache preferably comprises deallocation of said cells to permit subsequent overwriting thereof by newly introduced cached data.

For purposes of the appended claims, the recited "first means" will be understood to correspond to at least the cache manager 190 which carries out data caching operations in accordance with FIG. 11.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular application without departing from the spirit and scope of the present invention.

What is claimed is:

1. An apparatus comprising a cache manager configured to adaptively initiate a transfer of speculative non-requested data from a data structure portion of a storage array responsive to a stream count of read requests for consecutive data from said portion greater than a predetermined stream count threshold and a measured elapsed time interval since a most recent access of said portion of the storage array less than a predetermined time interval threshold.

2. The apparatus of claim 1, wherein for a selected stream count, the cache manager is configured to initiate said transfer of speculative non-requested data from the portion of the storage array to a cache memory when the elapsed time interval is less than a selected value and the cache manager is configured to prevent said transfer of speculative non-requested data from the portion of the storage array to the cache memory when the elapsed time interval is greater than the selected value.

3. The apparatus of claim 1, wherein for a selected elapsed time interval, the cache manager is configured to initiate said transfer of speculative non-requested data from the portion to the cache memory when the stream count is greater than a selected value and the cache manager is configured to prevent said transfer of speculative non-requested data when the stream count is less than the selected value.

4. The apparatus of claim 1, wherein the data structure portion is a RAID stripe comprising contiguous data on a selected storage device of the storage array.

5. The apparatus of claim 4, wherein the requested readback data comprises a first portion of said RAID stripe, and wherein the speculative non-requested readback data comprises the remaining portion of said RAID stripe.

6. The apparatus of claim 5, wherein a stripe data descriptor (SDD) is maintained in conjunction with the cached readback and speculative non-requested readback data of the RAID stripe, the SDD comprising a stream count variable and a stream size variable associated with said data.

7. The apparatus of claim 1, wherein the cache manager further deallocates the non-requested speculative data from the cache memory in relation to a locality parameter and a time parameter associated with accesses to said data structure portion.

8. The apparatus of claim 1, wherein the cache manager concurrently manages a plurality of independent streams within the data structure portion.

9. The apparatus of claim 1, wherein the elapsed time interval since a most recent access of said portion comprises a duration of time since execution of a physical transfer of data from said portion to the cache memory.

10. The apparatus of claim 1, wherein the time parameter comprises a measured elapsed time interval between commands to transfer the requested readback data to the cache memory.

11. The apparatus of claim 1, in which the stream count comprises a value corresponding to an accumulated number of read requests from a host device to the cache manager for consecutive data from said portion of the storage array, and the time interval comprises a value corresponding to an elapsed time over which the accumulated number of read requests have been issued.

12. A method comprising steps of storing requested readback data from a data structure portion of a storage array to cache memory, and transferring speculative non-requested readback data from said portion to the cache memory in conjunction therewith in relation to an elapsed time parameter associated with said portion less than an elapsed time threshold and a locality parameter associated with said portion greater than a stream count threshold.

13. The method of claim 12, wherein the transferring step comprises detecting a stream comprising a consecutive series of read requests for a contiguous range of data from the storage array and transferring said speculative non-requested readback data in relation to the detection of the stream only if the elapsed time parameter is less than a predetermined value.

14. The method of claim 12, wherein the locality parameter comprises a stream count comprising an incremented count of consecutive read requests for a contiguous data range of the storage array and the time parameter comprises an aging indication of a time range in which said read requests have been issued, wherein the non-requested speculative readback data are transferred when both said parameters fall within a selected threshold range.

15. The method of claim 12, wherein the data structure comprises a RAID stripe comprising contiguous data on a selected storage device of the storage array.

16. The method of claim 15, wherein the requested readback data comprises a first portion of said RAID stripe, and wherein the speculative non-requested readback data comprises the remaining portion of said RAID stripe.

17. The method of claim 16, further comprising a step of maintaining a stripe data descriptor (SDD) in conjunction with the cached readback and speculative non-requested readback data of the RAID stripe, the SDD comprising a stream count variable and a stream size variable associated with said data.

18. The method of claim 12, further comprising a subsequent step of deallocating the non-requested speculative data from the cache memory in relation to a locality parameter and a time parameter associated with accesses to a data structure of which the non-requested speculative data forms a part.

19. The method of claim 12, further comprising steps of arranging the requested and speculative non-requested readback data in the cache memory as a first consolidated stream that extends across a first range of contiguous block addresses, and subsequently deallocating a portion of the non-requested readback data in a medial location of the stream from the cache memory to form respective second and third streams from the remaining portions of the first stream.

20. The method of claim 12, wherein the data structure comprises a plurality of associated RAID stripes across logically associated storage devices in a storage array.

21. The method of claim 12, wherein the time parameter comprises a measured elapsed time interval between commands to transfer the requested readback data to the cache memory.

22. An apparatus comprising a controller having associated programming in a computer memory, the programmed controller adapted to direct a transfer of requested data from a portion of a storage array to a cache memory responsive to read requests from a host device, to accumulate a plural count of said read requests for data from said portion, to measure an elapsed time interval associated with said count, and to direct a transfer of speculative non-requested data from the portion to the cache memory in conjunction with the requested data when the accumulated count and the measured time interval respectively satisfy predetermined threshold values that define a sequence of speculative non-requested data transfer decision points.

23. The apparatus of claim 22, in which the predetermined threshold values are selected to so that a relatively small accumulated count will result in a speculative non-requested data transfer for a corresponding relatively short measured time interval but will not result in a speculative non-requested data transfer for a corresponding relatively long measured time interval.

24. The apparatus of claim 22, in which the predetermined threshold values are selected to so that a relatively small measured time interval will result in a speculative non-requested data transfer for a corresponding relatively large accumulated count but will not result in a speculative non-requested data transfer for a corresponding relatively small accumulated count.

* * * * *